(12) United States Patent
Hwang et al.

(10) Patent No.: US 10,197,717 B2
(45) Date of Patent: Feb. 5, 2019

(54) WINDOW MEMBER AND DISPLAY DEVICE INCLUDING THE SAME

(71) Applicant: SAMSUNG DISPLAY CO., LTD., Yongin, Gyeonggi-Do (KR)

(72) Inventors: Hyeon-Deuk Hwang, Yongin (KR); Ik-Jun Hong, Yongin (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 306 days.

(21) Appl. No.: 14/668,489

(22) Filed: Mar. 25, 2015

(65) Prior Publication Data
US 2015/0285975 A1 Oct. 8, 2015

(30) Foreign Application Priority Data

Apr. 3, 2014 (KR) .................... 10-2014-0039817

(51) Int. Cl.
| | |
|---|---|
| *G02B 5/28* | (2006.01) |
| *C09K 5/06* | (2006.01) |
| *G06F 1/16* | (2006.01) |

(52) U.S. Cl.
CPC .............. *G02B 5/287* (2013.01); *C09K 5/063* (2013.01); *G06F 1/16* (2013.01)

(58) Field of Classification Search
CPC ............ C09J 153/00; B32B 37/12; B32B 2037/1253; B32B 2307/412; B32B 2310/0831; B32B 2457/20; B32B 37/02; G02F 1/0147; G02F 1/13338; G02F 1/133617; G02F 1/13363; C09K 5/063; E06B 9/24; F21V 9/00; G02B 5/23; G02B 5/287; G02B 5/28; H04M 1/0266; H05K 5/03; H05K 7/20963
See application file for complete search history.

(56) References Cited

U.S. PATENT DOCUMENTS

| | | | | |
|---|---|---|---|---|
| 5,107,356 A | * | 4/1992 | Castleberry | G02F 1/13363 349/102 |
| 2005/0188851 A1 | * | 9/2005 | Yamazaki | F02M 25/0854 96/153 |
| 2006/0063066 A1 | * | 3/2006 | Choi | H01M 4/62 429/120 |
| 2007/0125997 A1 | * | 6/2007 | Kim | G02F 1/0147 257/13 |
| 2008/0055420 A1 | * | 3/2008 | Orihashi | H04N 5/2253 348/208.4 |
| 2009/0002620 A1 | * | 1/2009 | Yamashita | C08F 297/026 349/137 |
| 2011/0292488 A1 | * | 12/2011 | McCarthy | G02F 1/0147 359/265 |
| 2013/0056175 A1 | * | 3/2013 | Hidalgo | F28D 20/021 165/61 |
| 2013/0221285 A1 | | 8/2013 | Song et al. | |

(Continued)

*Primary Examiner* — Bumsuk Won
*Assistant Examiner* — Balram T Parbadia
(74) *Attorney, Agent, or Firm* — Lee & Morse, P.C.

(57) ABSTRACT

A window member for a display device includes a base substrate having a light transmission area and a light blocking area adjacent to the light transmission area. A light blocking layer is disposed on one surface of the base substrate in the light blocking area. The light blocking layer includes a light blocking base capable of blocking light; and a heat radiating pigment dispersed on the light blocking base.

12 Claims, 7 Drawing Sheets

(56) References Cited

U.S. PATENT DOCUMENTS

2013/0301272 A1* 11/2013 Wang .................... G06F 1/1656
362/293
2014/0153217 A1* 6/2014 Kang ....................... G02B 5/23
362/84

* cited by examiner

WINDOW MEMBER AND DISPLAY DEVICE INCLUDING THE SAME

CROSS-REFERENCE TO RELATED APPLICATION

The present application claims priority under 35 U.S.C. § 119 to Korean Patent Application No. 10-2014-0039817, filed on Apr. 3, 2014, in the Korean Intellectual Property Office, and entitled: "Window Member And Display Device Including The Same," which is incorporated by reference herein in its entirety.

BACKGROUND

1. Field

Embodiments relate to a window member, and a display device including the same.

2. Description of the Related Art

According to development of an information-oriented society, various display panels, such as an Organic Light Emitting Display (OLED) panel, a Liquid Crystal Display (LCD) panel, an Electrophoresis Display (EPD) panel, and an Electrowetting Display (EWD) panel, are applied to a display device.

SUMMARY

Embodiments are directed to a window member including a base substrate. The base substrate may include a light transmission area and a light blocking area. The light blocking area may be adjacent to the light transmission area. A light blocking layer may be disposed on one surface of the base substrate in the light blocking area. The light blocking layer may include a light blocking base capable of blocking light and a heat radiating pigment dispersed in the light blocking base.

The heat radiating pigment may include a center core including a latent heat material, and a core cover layer substantially surrounding the center core.

The phase change temperature of the latent heat material may be from about 15° C. to 50° C.

The latent heat material may be one of an inorganic salt hydrate having a formula ($M_n \cdot H_2O$), where n is a positive non-zero integer, a paraffin-based hydrocarbon material having a formula ($C_nH_{2n+2}$), where n is a positive non-zero integer, and a fatty acid composition having a formula ($CH_3(CH_2)_nCOOH$), where n is a positive non-zero integer.

The inorganic salt hydrate may be at least one of $Na_2SO_4 \cdot 10H_2O$, $Z_n(NO_3)2 \cdot 6H_2O$, $CaCl_2 \cdot 6H_2O$, $Na_2S_2O_3 \cdot 5H_2O$, $Na_2HPO_4 \cdot 12H_2O$, and $Na_4P_2O_7 \cdot 10H_2O$.

The paraffin-based hydrocarbon material may be at least one of eicosane, nonadecane, octadecane, hepadecane, and hexadecane.

The fatty acid composition may be at least one of caprylic acid, capric acid, and lauric acid.

The core cover layer may have a same color as that of the light blocking base.

The core cover layer may include a polymer material.

A diameter of the heat radiating pigment may be about 1 nm to 100 μm.

The window member may further include a polymer film disposed between the base substrate and the light blocking layer, the polymer film covering one surface of the base substrate; an adhesive layer disposed between the base substrate and the polymer film; a pattern printed layer disposed between the polymer film and the light blocking layer in the light blocking area; and a depositing film disposed between the pattern printed layer and the light blocking layer in the light blocking area, the depositing film including a plurality of layers having different refractive indices. The base substrate may be a transparent substrate.

The heat radiating pigment may include a center core including a carbon crystalline material, and a core cover layer surrounding the center core.

The carbon crystalline material may be one of a carbon nano tube, graphite, and graphene.

Embodiments are also directed to a display device including a display panel configured to display an image by emitting light from a side surface thereof, and a window member disposed on the side surface of the display panel from which the light is emitted. The window member may include a base substrate including a light transmission area and a light blocking area. The light blocking area may be adjacent to the light transmission area. The light blocking layer may include a light blocking base and a heat radiating pigment dispersed in the light blocking base. The light blocking base may have a color, and may be capable of blocking light. The light blocking layer may be disposed on one surface of the base substrate in the light blocking area.

The heat radiating pigment may include a center core including a latent heat material, and a core cover layer surrounding the center core.

A phase change temperature of the latent heat material may be from about 15° C. to 50° C.

The latent heat material may be one of an inorganic salt hydrate having a formula ($M_n \cdot H_2O$), where n is a positive non-zero integer, a paraffin-based hydrocarbon material having a formula ($C_nH_{2n+2}$), where n is a positive non-zero integer, and a fatty acid composition having a formula ($CH_3(CH_2)_nCOOH$), where n is a positive non-zero integer.

A diameter of the heat radiating pigment may be from about 1 nm to 100 μm.

The display device may further include a polymer film disposed between the base substrate and the light blocking layer, the polymer film covering one surface of the base substrate, an adhesive layer disposed between the base substrate and the polymer film, a pattern printed layer disposed between the polymer film and the light blocking layer in the light blocking area, and a depositing film disposed between the pattern printed layer and the light blocking layer in the light blocking area, the depositing film including a plurality of layers having different refractive indices.

The base substrate may be a transparent substrate.

The heat radiating pigment may include a center core including a carbon crystalline material, and a core cover layer surrounding the center core.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
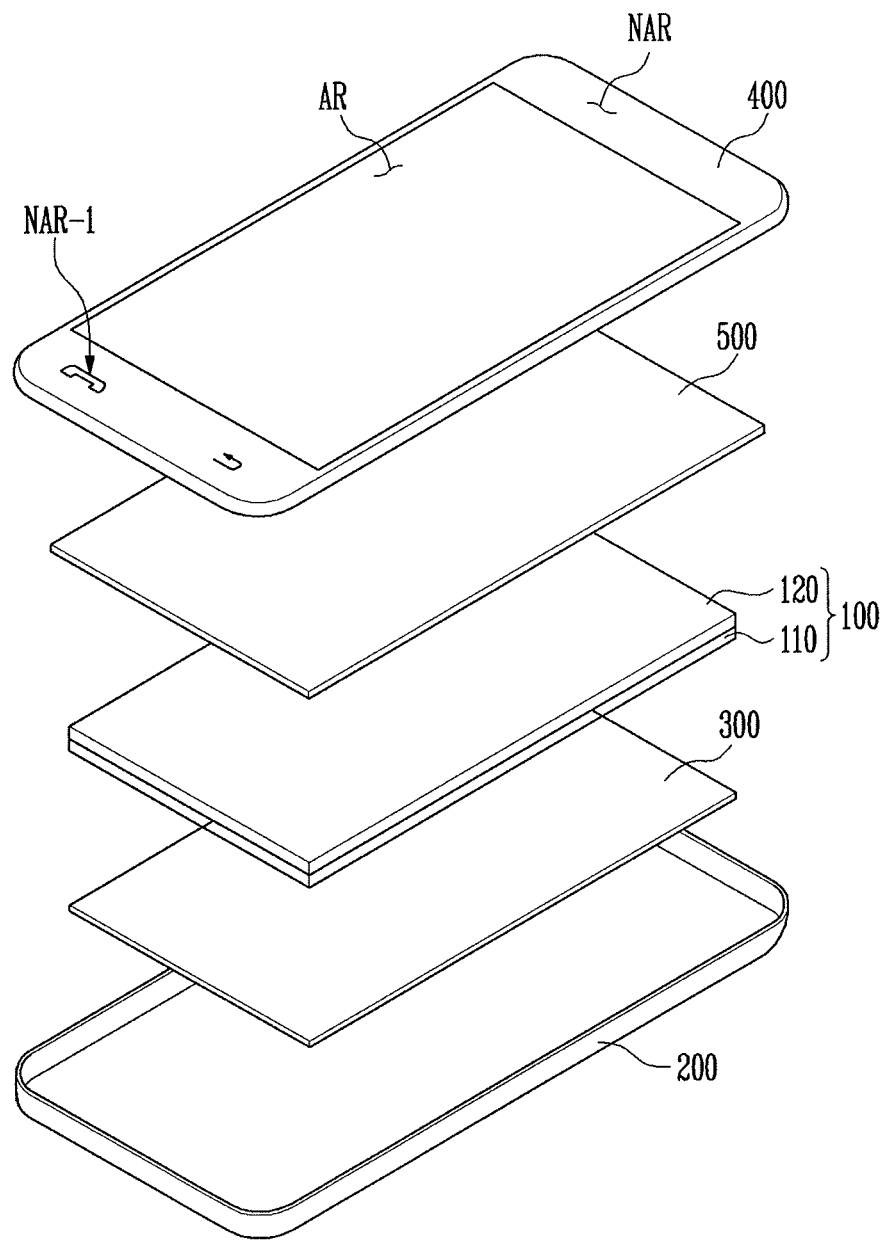
FIG. 1 illustrates an exploded perspective view of a display device according to an example embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It should be understood that terms "include" or "have" indicates that a feature, a number, a step, an operation, a component, a part or the combination thereof described in the specification is present, but do not exclude a possibility of presence or addition of one or more other features, numbers, steps, operations, components, parts or combinations, in advance. It will be understood that when an element such as a layer, film, region, or substrate is referred to as being "on" another element, it can be directly on the other element or intervening elements may also be present. On the contrary, it will be understood that when an element such as a layer, film, region, or substrate is referred to as being "under" or "beneath" another element, it can be directly beneath the other element or intervening elements may also be present. In addition, it will also be understood that when a layer is referred to as being "between" two layers, it can be the only layer between the two layers, or one or more intervening layers may also be present. Like reference numerals refer to like elements throughout.

Embodiments described herein may be variously modified and have various forms. While specific embodiments will be illustrated in the drawings and described in the detailed description, it should be understood that embodiments are not limited to the specific embodiments, but include all changes, equivalents, or alternatives which are included in the spirit and technical scope of the example embodiments.

In the accompanying drawings, sizes of structures are illustrated to be enlarged compared to actual sizes for clarity. Terms "first", "second", and the like may be used for describing various constituent elements, but the constituent elements should not be limited to the terms. The terms are used only to discriminate one constituent element from another constituent element. For example, a first element could be termed a second element, and similarly, a second element could be also termed a first element without departing from the scope of the present disclosure. As used herein, the singular forms are intended to include the plural forms as well, unless the context clearly indicates otherwise.

Hereinafter, an example embodiment will be described in more detail with reference to the accompanying drawings.

Figure 2:
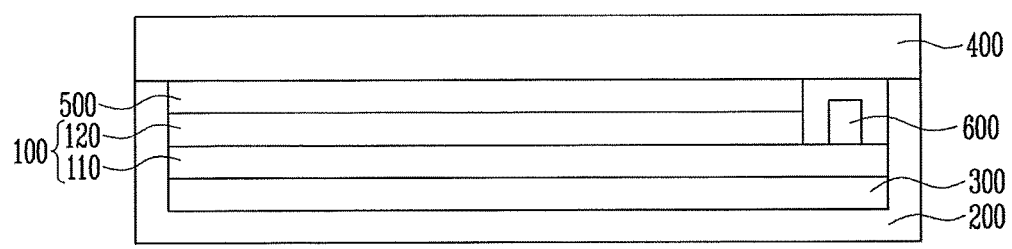
FIG. 2 illustrates a cross-sectional view of the display device of FIG. 1.

FIG. 1 illustrates an exploded perspective view of a display device according to an example embodiment, and FIG. 2 illustrates a cross-sectional view of the display device of in FIG. 1.

Referring to FIGS. 1 and 2, a mobile device includes a display panel 100, a housing 200 for accommodating the display panel 100, an impact absorption sheet 300 disposed between the display panel 100 and the housing 200, a window member 400 disposed on the display panel 100, an adhesive sheet 500 between the display panel 100 and the window member 400, and a driving unit 600 for driving the display panel 100.

The display panel 100 may display an image. The display panel 100 may be, for example, a self emitting display panel, such as an organic light-emitting display (OLED) panel. Further, a non-emissive display panel, such as a liquid crystal display (LCD) panel, an electro-phoretic display (EPD) panel, an electro-wetting display (EWD) panel, etc., may be used as the display panel 100. When a non-emissive display panel is used as the display panel 100 in a mobile device, the mobile device may further include a back light unit for supplying light to the display panel 100. An example embodiment in which the display panel 100 includes an OLED will be described below.

The display panel 100 may include a first substrate 110 on which an organic light emitting device is disposed as a display device, and a second substrate 120 facing the first substrate 110.

The first substrate 110 may include a thin film transistor substrate (not illustrated) including one or more thin film transistors disposed on an insulating substrate. The organic light emitting device may be connected to the thin film transistor. The first substrate 110 may include a driving unit 600, as shown in FIG. 2. The driving unit 600 may be disposed at one side of the thin film transistor substrate. The driving unit 600 may be capable of driving the organic light emitting device. The driving unit 600 may be a chip-on-glass (COG) type driving device.

The organic light emitting device may be disposed on the thin film transistor substrate of first substrate 110. The organic light emitting device disposed on substrate 110 may include a first electrode connected to the thin film transistor, an organic layer disposed on the first electrode, and a second electrode disposed on the organic layer (not illustrated). Any one of the first electrode and the second electrode may be an anode electrode, and the other one may be a cathode electrode. Any one of the first electrode and the second electrode may be transparent.

The first electrode may be a conductive layer including a transparent conductive oxide such as indium tin oxide (ITO), an indium zinc oxide (IZO), an aluminum zinc oxide (AZO), a gallium-doped zinc oxide (GZO), a zinc tin oxide (ZTO), a gallium tin oxide (GTO), and a fluorine-doped tin oxide (FTO). The second electrode may reflect light, and may include at least one of Mo, MoW, Cr, Al, AlNd, and an Al alloy. The second electrode may have a lower work function than that of the first electrode.

The organic layer may include an emitting layer (EML), and may generally include a multilayer thin film structure. The organic layer may include a hole injection layer (HIL) for injecting holes. The organic layer may also include a hole transport layer (HTL), which may have excellent hole transporting performance, and may suppress a movement of electrons that failed to be combined in the EML. This may increase the opportunity for recombination of the holes and the electrons. The EML may emit light by the recombination of the injected electrons and holes. The organic layer may further include a hole blocking layer (HBL) for suppressing a movement of holes that failed to be combined in the EML, an electron transport layer (ETL) for smoothly transporting electrons to the EML, and an electron injection layer (EIL) for injecting electrons.

The color of light generated in the EML may be any color. For example, the color of light generated in the EML may be one of red, green, blue, and white, etc. For example, the color of light generated in the EML may be one of magenta, cyan, and yellow.

The second substrate 120 may isolate the organic light emitting device from an external environment. The second substrate 120 may be bonded to the first substrate 110 with a sealing material, such as a sealant. For example, the second substrate 120 may be a transparent insulating substrate. In certain instances, the organic light emitting device may be sealed with a transparent insulating layer or the like. In certain example embodiments, the second substrate 120 may be omitted.

The housing 200 may accommodate the display panel 100. The housing 200 may be formed from one member having a space for accommodating the display panel 100. However, two or more members may be combined to form the housing 200. FIG. 1 illustrates an example where the housing is formed from one member in which a space for accommodating the display panel 100 is included. Hereinafter, a housing 200 formed from one member according to an example embodiment will be described.

The housing 200 may further accommodate a printed circuit board (not illustrated) in which a driving circuit chip is mounted, in addition to the display panel 100. A power unit (not illustrated), such as a battery, may be further accommodated in the housing 200, according to the type of mobile device.

The impact absorption sheet 300 may be disposed between the display panel 100 and the housing 200. The impact absorption sheet 300 may partially or substantially absorb any force arising from an external impact that may be applied to the display panel 100. The impact absorption sheet 300 may prevent an external impact or force from being directly applied to the display panel 100, or may at least reduce the impact or force that is directly applied to the display panel 100.

The impact absorption sheet 300 may include an impact absorption film (not illustrated) capable of absorbing external impact, and an adhesive (not illustrated) applied on one or both major surfaces of the impact absorption film. For example, the adhesive may be applied to one surface of the impact absorption film to fix or adhere the impact absorption sheet 300 to the display panel 100 or the housing 200. The impact absorption film may include a rubber foam or a stacked material of the rubber foam. The impact absorption film may generally have a thickness of about 300 μm.

The window member 400 may be disposed in a direction in which an image is output in the display panel 100. In other words, the window member 400 may be disposed over the image display side of the display panel. The window member may be coupled to the housing 200. The coupled window member 400 and housing 200 may constitute an exterior surface of the mobile device.

The window member 400 may be divided into a light transmission area AR allowing light generated in the display panel 100 to pass through, and a light blocking area NAR, outside the light transmission area AR when viewed in the plane. The light blocking area NAR may not allow the light to pass through. The light blocking area NAR may surround a periphery of the transmission area AR when viewed from a top plan view. At least a part of the light blocking area NAR may be defined as an icon area NAR-I. The icon area NAR-I may be activated when the mobile device is operated in a specific mode.

The window member 400 may absorb heat generated in the display panel 100 and the driving unit 600.

An adhesive sheet 500 bonds the display panel 100 and the window member 400. The adhesive sheet 500 may be transparent so as to reduce or prevent a decrease in the luminance of an image output in the display panel 100. For example, the adhesive sheet 500 may include a transparent polymer resin which has an adhesive property. The transparent polymer resin may be curable by light or heat.

The driving unit 600 may drive the display panel 100. The driving unit 600 may be disposed at one side of the display panel. The driving unit 600 may be accommodated in the housing 200 together with the display panel 100. In certain instances, the driving unit 600 may be a chip-on-glass (COG) type driving device disposed at one side of the first substrate 110. The driving unit 600 may be a driving IC chip disposed at one side of the display panel 100. The driving unit 600 may be any driving unit suitable for use with the display device including display panel 100.

Figure 3:
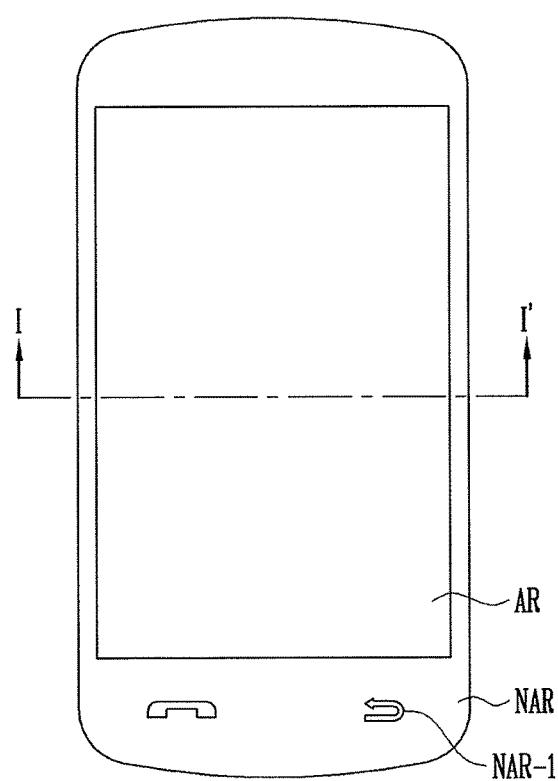
FIG. 3 illustrates a top plan view of the window member of FIG. 1.
Figure 4:
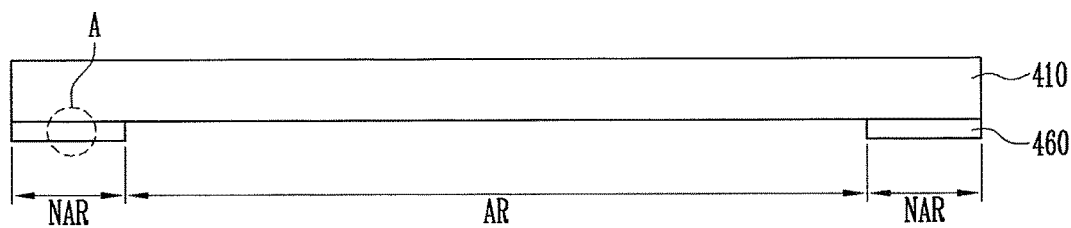
FIG. 4 illustrates a cross-sectional view taken along line I-I' of FIG. 3.
Figure 5:
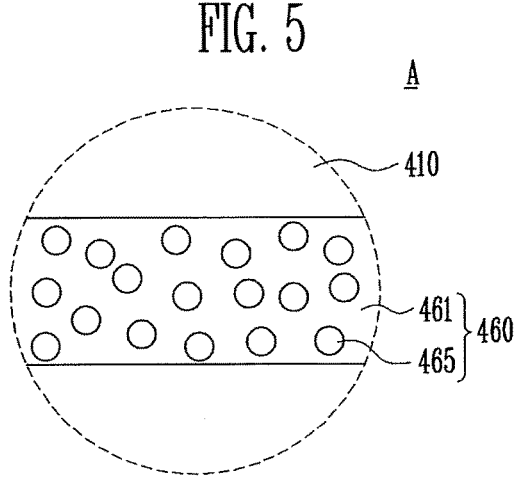
FIG. 5 illustrates an enlarged view of region A of FIG. 4.
Figure 6:
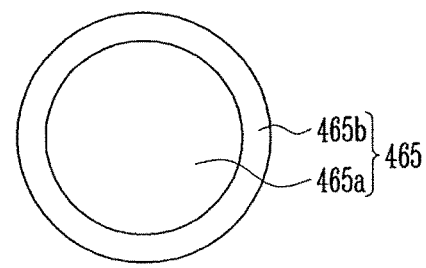
FIG. 6 illustrates a cross-sectional view of the heat radiating pigment of region A in FIG. 5.
Figure 7:
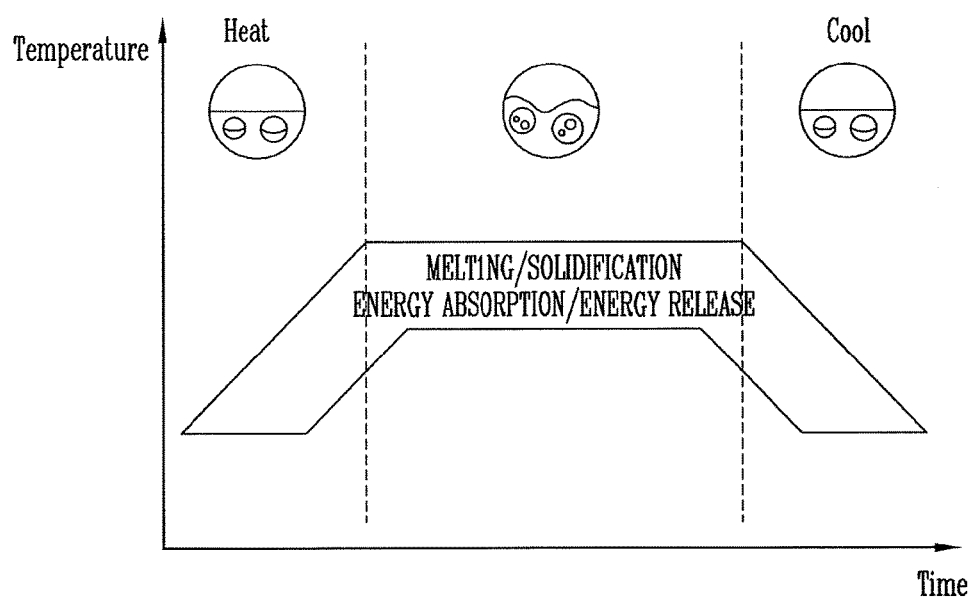
FIG. 7 illustrates a graph of the state of the heat radiating pigment according to a neighboring environment.

FIG. 3 illustrates a top plan view of the window member of FIG. 1, FIG. 4 illustrates a cross-sectional view taken along line I-I' of FIG. 3, FIG. 5 illustrates an enlarged view of region A of FIG. 4, FIG. 6 illustrates a cross-sectional view of a heat radiating pigment of FIG. 5, and FIG. 7 is a graph showing a state of the heat radiating pigment according to a neighboring environment.

Referring to FIGS. 3 to 7, the window member 400 may be divided into the light transmission area AR, and the light blocking area NAR outside the light transmission area AR. At least a part of the light blocking area NAR may be defined as the icon area NAR-I. The light transmission area AR may be an area allowing the image generated in the display panel 100 to pass through.

The window member 400 may include a base substrate 410 and a light blocking layer 460.

The base substrate 410 may have a quadrangular shape. The quadrangular shape may have round corner portions. However, the base substrate may have any shape suitable for use with window member 400 and display panel 100 in a display device. The base substrate 410 may be a transparent substrate. For example, base substrate 410 may be a high strength transparent plastic substrate or a high strength transparent glass substrate.

The light blocking layer 460 may be disposed on one surface of the base substrate 410 in the light blocking area NAR. In the light blocking area NAR, the light blocking layer 460 may prevent the light from passing through. The light blocking layer 460 may have various colors or any color according to a demand of a user. For example, the light blocking layer 460 may have one color among black, white, red, blue, and pink.

As shown in FIG. 5, the light blocking layer 460 may include a light blocking base 461 implementing a color of the light blocking layer 460. Light blocking layer 460 may also include a heat radiating pigment 465 dispersed in the light blocking base 461.

The light blocking base 461 may have a specific color. The light blocking base 461 may include color ink capable of implementing color. The color of the light blocking base 461 may be determined according to the color of the light blocking layer 460. The color of light blocking base 461 may be the same as light blocking layer 460.

As shown in FIG. 6, the heat radiating pigment 465 may include a center core 465a and a core cover layer 465b. A diameter of the heat radiating pigment 465 may be from about 1 nm to 100 µm (and all sub-ranges therebetween).

The center core 465a may include a latent heat material. The latent heat material may be a phase-change material capable of storing and releasing large amounts of energy. The latent heat material may be a material that undergoes a phase change at a specific temperature, absorbing or emitting a large amount of heat without a substantial change in temperature.

For example, the latent heat material may be a solid-liquid phase change material. The temperature of the latent heat material may initially rise as it absorbs heat. However, when the latent heat material reaches the temperature at which it changes phase (e.g., the melting temperature, in the case of a solid-to-liquid phase change material), the latent heat material may absorb large amounts of heat while remaining at a substantially constant temperature. The latent heat material may continue to absorb heat without a significant increase in temperature until all the material is transformed to the liquid phase. The latent heat material may release the absorbed heat when the ambient temperature proximate to the latent heat material falls.

Storing heat energy using a latent heat material may permit a larger amount of heat per unit volume or unit weight to be stored than when a sensible heat storage (SHS) material is used.

The temperature at which the latent material changes phase (the phase-change temperature) may be from about 15° C. to 50° C. (and all sub-ranges therebetween). The phase-change temperature may be, for example, a melting point or a crystallization temperature. The latent heat material may be one of an inorganic salt hydrate having a formula $(M_n.H_2O)$, where n is a positive non-zero integer, a paraffin-based hydrocarbon material having a formula $(C_nH_{2n+2})$, where n is a positive non-zero integer, and a fatty acid composition having a formula $(CH_3(CH_2)_nCOOH)$, where n is a positive non-zero integer.

The inorganic salt hydrate may be at least one of $Na_2SO_4.10H_2O$, $Zn(NO_3)_2.6H_2O$, $CaCl_2.6H_2O$, $Na_2S_2O_3.5H_2O$, $Na_2HPO_4.12H_2O$, and $Na_4P_2O_7.10H_2O$.

The paraffin-based hydrocarbon material may be at least one of eicosane, nonadecane, octadecane, hepadecane, and hexadecane.

The fatty acid composition may be at least one of caprylic acid, capric acid, and lauric acid.

As shown in FIG. 6, the core cover layer 465b may surround the center core 465a. Core cover layer 465b may separate the center core 465a from an external environment. For example, core cover layer 465b may separate center core 465a from light blocking base 461. The core cover layer 465b may include a polymer material.

The core cover layer 465b may have the same color as the light blocking base 461. Thus, the heat radiating pigment 465 may be the same color as the light blocking base 461 in which they are dispersed. Light blocking base 461 may have a uniform color. Light blocking layer 460 may have a uniform color.

Figure 8:
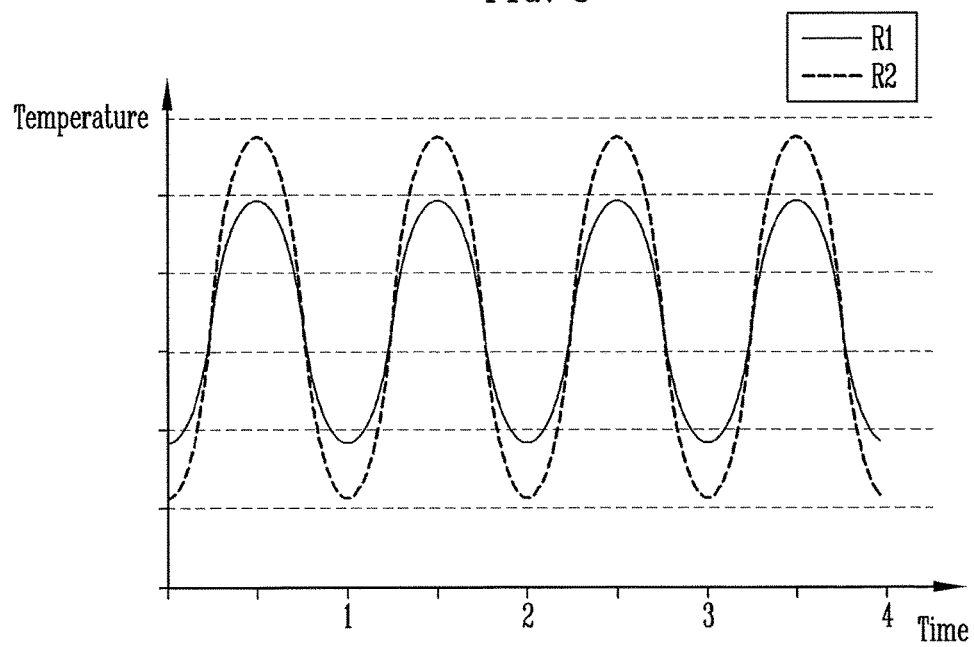
FIG. 8 illustrates a graph of the change in a temperature over a period of time of display device R2 including a window member to which the heat radiating pigment is not applied, and display device R1 including the window member to which the heat radiating pigment is applied.
Figure 9:
FIG. 9 illustrates an image of display device R2, captured by a thermo-graphic camera.
Figure 10:
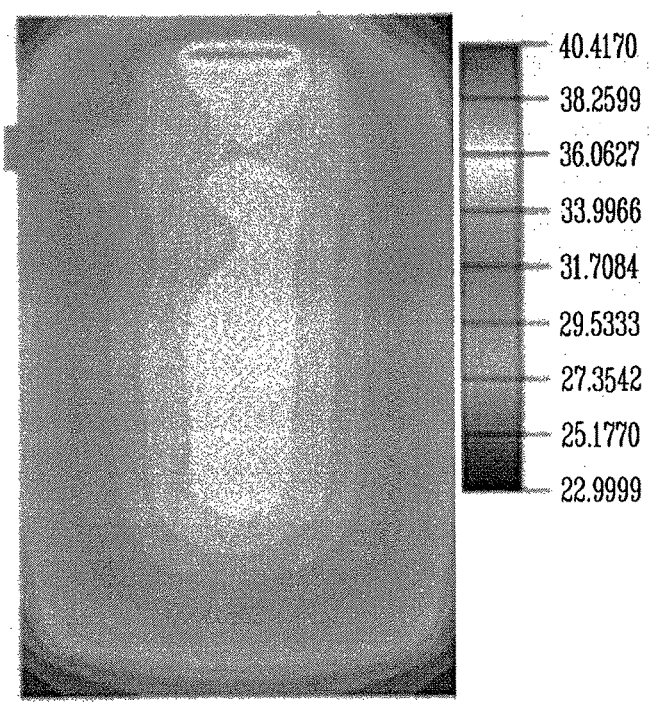
FIG. 10 illustrates the result of a temperature distribution simulation of display device R2.
Figure 11:
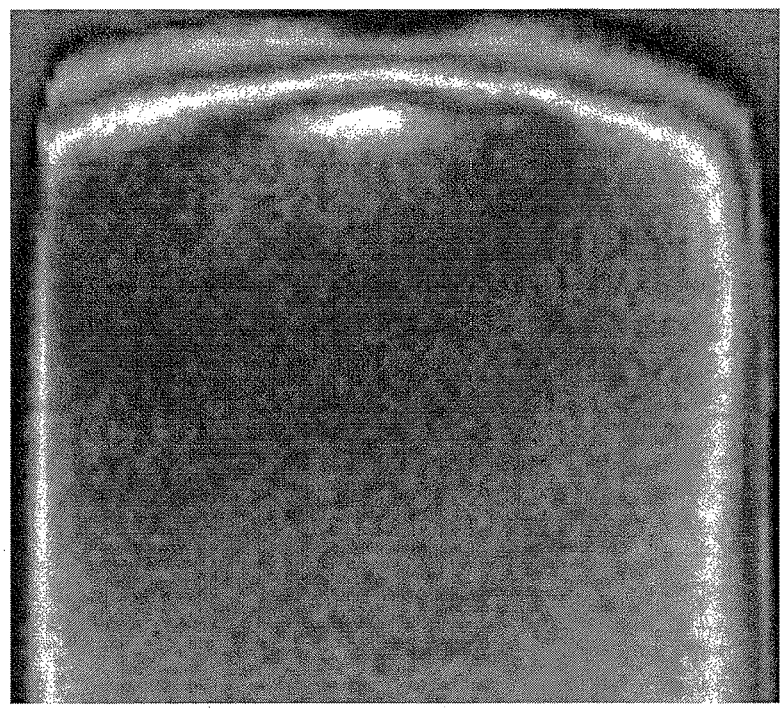
FIG. 11 illustrates an image of display device R1, captured by a thermo-graphic camera.
Figure 12:
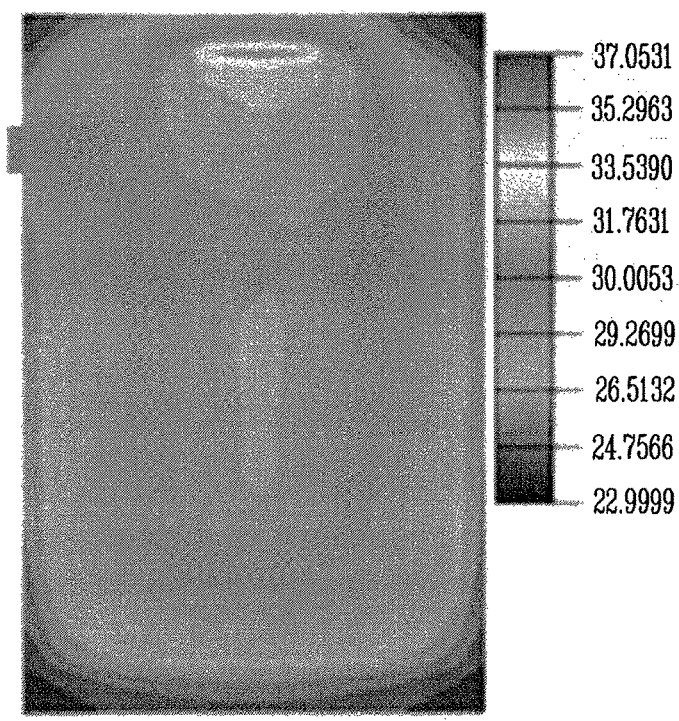
FIG. 12 illustrates the result of a temperature distribution simulation of display device R1.

FIG. 8 is a graph showing the change in temperature of time of display device R1, which includes a window member to which the heat radiating pigment is applied, and display device R2, which includes a window member to which the heat radiating pigment is not applied. FIG. 9 illustrates an image of display device R2, captured by a thermo-graphic camera, and FIG. 10 illustrates the result of a temperature distribution simulation of display device R2. FIG. 11 illustrates an image of display device R1, captured by a thermo-graphic camera, and FIG. 12 illustrates the result of a temperature distribution simulation of display device R1.

Referring to FIGS. 8 to 12, the highest temperature of display device R1 (which includes a window member to which the heat radiating pigment is applied), is measured as about 32.9° C. The highest temperature of display device R2 (which includes a window member to which the heat radiating pigment is not applied), is measured as about 35.2° C. FIGS. 9-12 illustrate that the area in which the highest temperature is measured is an area corresponding to the driving unit of the display device. From FIGS. 8-12 it can be seen that the highest temperature of display device R1 is lower than the highest temperature of display device R2.

As can be seen from FIG. 8, the rate of temperature change of the display device R1 is lower than the rate of temperature change of the display device R2. It can also be seen that the range of temperature change (the difference between the highest and lowest temperatures reached) of the display device R1 is lower than the range of temperature change of the display device R2.

This will be described in detail below.

The driving unit of the display device may transmit a signal to the display panel (an on state). An image may be displayed on the display panel. Heat may be generated in the driving unit and the display panel. The heat may be transmitted to the window member.

The window member may absorb heat. When a heat radiating pigment having a center core including latent heat material is applied to the window member, the heat radiating pigment may absorb the heat. When the heat radiating pigment absorbs the heat, the center core inside the heat radiating pigment may accumulate heat absorbed through a phase change. As the center core absorbs heat, the temperature may increase until the latent heat material reaches its phase-change temperature. When the latent heat material reaches its phase-change temperature, the latent heat material may absorb the heat generated by the display panel and driving unit without an increase in temperature.

Thus, a window member to which heat radiating pigment has been applied may be capable of absorbing heat without a substantial increase in temperature. Therefore, the highest temperature of the display device R1 (the display device including the window member to which the heat radiating pigment is applied) may be lower than the highest temperature of the display device R2 (the display device including the window member to which the heat radiating pigment is not applied). The rate of temperature increase of the display device R1 may be lower than the rate of temperature increase of the display device R2.

As can be seen from FIGS. 9-12, in the state where the display devices have the highest temperature, the temperature distribution of the display device R1 is more uniform than the temperature distribution of the display device R2.

In the display device, when an operation of the driving unit and the display panel is stopped (an off state), the window member(s) may discharge the absorbed heat.

The window member to which the heat radiating pigment is applied absorbs some of the heat through the phase change of the center core, and discharges the remaining heat after the phase change is completed. The lowest temperature of display device R1 may be higher than the lowest temperature of the display device R2. The rate of temperature decrease of display device R1 may be higher than the rate of temperature decrease of the display device R2.

Figure 13:
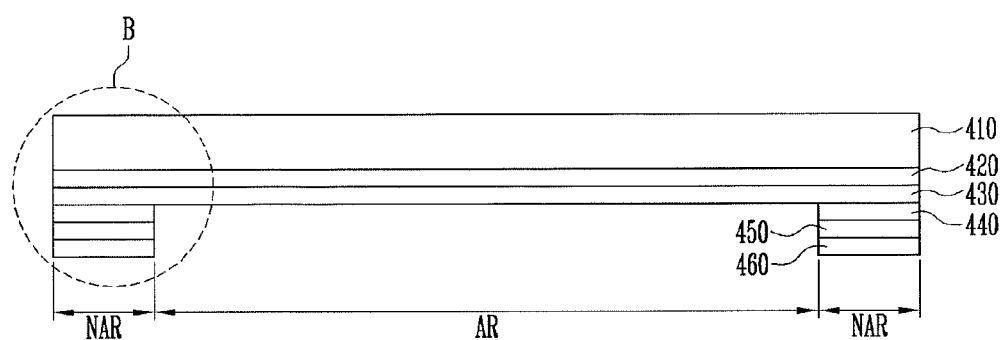
FIG. 13 illustrates a cross-sectional view of a window member of a display device according to another example embodiment.
Figure 14:
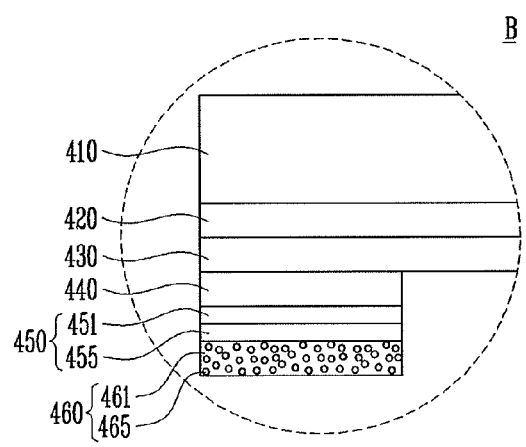
FIG. 14 illustrates an enlarged view of region B of FIG. 13.

Hereinafter, another example embodiment will be described with reference to FIGS. 13 and 14. In FIGS. 13 and 14, the same constituent elements as those illustrated in FIGS. 1 to 12 are denoted by the same reference numerals, and detailed descriptions thereof will be omitted. In order to avoid overlapping descriptions in FIGS. 13 and 14, different matters from those of FIGS. 1 to 12 will be mainly described.

FIG. 13 illustrates a cross-sectional view of a window member of a display device according to another example embodiment, and FIG. 14 illustrates an enlarged view of region B of FIG. 13.

Referring to FIGS. 13 to 14, a window member 400 may be divided into a light transmission area AR, and a light blocking area NAR outside the light transmission area AR. At least a part of the light blocking area NAR may be defined as the icon area NAR-I.

The window member 400 may include a base substrate 410, an adhesive layer 420, a polymer film 430, a pattern printed layer 440, a depositing film 450, and a light blocking layer 460.

The base substrate 410 may have a quadrangular shape. The quadrangular shape may have round corner portions. However, the base substrate may have any shape suitable for use with window member 400 and display panel 100 in a mobile device. The base substrate 410 may be a transparent substrate. For example, base substrate 410 may be a high strength transparent plastic substrate or a high strength transparent glass substrate.

The adhesive layer 420 may be disposed between the base substrate 410 and the polymer film 430 to bond the base substrate 410 and the polymer film 430 together. The adhesive layer 420 may include a transparent adhesive. The transparent adhesive may be a pressure sensitive adhesive (PSA) or a UV-curable resin.

The polymer film 430 may be disposed on a surface of the adhesive layer 420 facing the direction of the display panel 100. Polymer film 430 may be disposed between the base substrate 410 and display panel 100. The polymer film 430 may cover one surface of the base substrate 410. The polymer film 430 may include a material through which light may pass. For example, the polymer film 430 may include one of a polymethylmethaacrylate (PMMA) resin, a polycarbonate (PC) resin, and a polyethylene terephthalate (PET) resin, etc. For example, the polymer film 430 may include any material that permits light transmittance after being cured. The material for polymer film 430 may be applicable to the display device.

The pattern printed layer 440 may be disposed on a surface of the polymer film 430 facing the direction of the display panel 100. Pattern printed layer 440 may be disposed between polymer film 430 and display panel 100. The pattern printed layer 440 may include a photocurable material such as, for example, a UV-curable resin. The pattern printed layer 440 may include fine patterns formed on a surface thereof. For example, the pattern printed layer 440 may be patterned on a surface in an opposite direction to that of the polymer film 430 (i.e., the surface of pattern printed layer 440 closer to display panel 100 may be patterned). The fine patterns may disperse or refract incident light. The fine patterns may be aesthetic, and may give aesthetic sense.

The depositing film 450 may be disposed on a surface of the pattern printed layer 440 facing the direction of the display panel 100. The depositing film 450 may be disposed between pattern printed layer 440 and display panel 100. The depositing film 450 may include a plurality of layers having different refractive indices. For example, the depositing film 450 may include a first layer 451 disposed on the surface of the pattern printed layer 440 facing the direction of the display panel 100. First layer 451 of depositing film 450 may allow light to pass through. A second layer 455 may be disposed on the surface of the first layer 451 facing the direction of the display panel 100. Second layer 455 may have a different refractive index from that of the first layer 451. In certain example embodiments, the refractive index of the first layer 451 may be higher than that of the second layer 455. For example, the refractive index of each of the first layer 451 and the second layer 455 may be from about 1.3 to 2.4, and the refractive index of the first layer 451 may be at least about 0.1 higher than that of the second layer 455.

The first layer 451 and the second layer 455 may include different materials. The first layer 451 may include a material having a higher refractive index than the material included in second layer 455. For example, the first layer 451 may include $TiO_2$, and the second layer 455 may include $SiO_2$. The refractive index of first layer 451 including $TiO_2$ may be greater than that of second layer 455 including $SiO_2$.

The depositing film 450 may reflect light in a specific wavelength region by virtue of the difference in refractive index between the first layer 451 and the second layer 455. In certain examples, the background color of the light blocking area NAR of the window member 400 may be determined by depositing film 450.

While example embodiments have been described as including a depositing film 450 including first layer 451 and second layer 455, other example embodiments may include a depositing film 450 having a different structure. For example, the depositing film 450 may include a plurality of basic units including the first layer 451 and the second layer 455. A plurality of first layers 451 may be alternately stacked with second layers 455 to form depositing film 450.

The light blocking layer 460 may include a light blocking base 461. Light blocking base 461 may include an opaque organic insulating material, such as a black resin. Light blocking layer 460 may further include a heat radiating pigment 465 dispersed in the light blocking base 461.

The heat radiating pigment 465 may include a center core 465a including a latent heat material, and a core cover layer 465b having the same color as that of the light blocking base 461.

The heat radiating pigment 465 may also include a carbon crystalline material dispersed in the light blocking base 461. The carbon crystalline material may be included in the heat radiating pigment 465 in addition to or instead of the latent heat material. The carbon crystalline material may be one of a carbon nano tube, graphite, and graphene. The carbon crystalline material may be included in the center core 465a.

By way of summation and review, a display device may include a display panel, a driving unit for driving the display panel, a housing for accommodating the display panel and the driving unit, and a window for protecting an exposed surface of the display panel.

Heat may be generated in the display device during the use of the display device. The heat may be generated by an operation of the display panel and the driving unit. If the heat is not sufficiently discharged to the outside, erroneous operation of the display panel and the driving unit may occur.

Certain example embodiments described herein relate to a window member with an improved heat radiating property, and a display device including the same. In the aforementioned window member, the light blocking layer may include a heat radiating pigment including a latent heat material or the heat radiating pigment including a carbon crystal having excellent heat conductivity. Accordingly, in the display device, the window member including the light blocking layer described above may effectively absorb and discharge heat generated in the display panel or the driving unit to the outside. It may be possible to reduce the degree to which the temperature of the display panel and driving unit increase during use, as well as to reduce the rate of the temperature increase.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A window member, comprising:
   a base substrate including a light transmission area and a light blocking area, the light blocking area being adjacent to the light transmission area;
   a light blocking layer disposed on one surface of the base substrate in the light blocking area;
   a polymer film disposed between the base substrate and the light blocking layer, the polymer film covering one surface of the base substrate;
   an adhesive layer disposed between the base substrate and the polymer film;
   a pattern printed layer disposed between the polymer film and the light blocking layer in the light blocking area; and
   a depositing film disposed between the pattern printed layer and the light blocking layer in the light blocking area, the depositing film including a plurality of layers having different refractive indices,
   wherein;
   the light blocking layer includes a light blocking base capable of blocking light; and a heat radiating pigment dispersed in the light blocking base,
   the heat radiating pigment includes a center core including a latent heat material; and a core cover layer substantially surrounding the center core, the core cover layer including a polymer material in contact with the latent heat material.

2. The window member as claimed in claim 1, wherein a phase change temperature of the latent heat material is from about 15° C. to 50° C.

3. The window member as claimed in claim 1, wherein the core cover layer has a same color as that of the light blocking base.

4. The window member as claimed in claim 1, wherein a diameter of the heat radiating pigment is from about 1 nm to 100 μm.

5. The window member as claimed in claim 1, wherein the heat radiating pigment includes:
   the center core including a carbon crystalline material; and
   the core cover layer surrounding the center core.

6. The window member as claimed in claim 5, wherein the carbon crystalline material is one of a carbon nano tube, graphite, and graphene.

7. The window member as claimed in claim 1, wherein the latent heat material includes an inorganic salt hydrate having a formula ($M_n.H_2O$), where n is a positive non-zero integer, the inorganic salt hydrate is at least one of $Na_2SO_4.10H_2O$, $Zn(NO_3)_2.6H_2O$, $CaCl_2.6H_2O$, $Na_2S_2O_3.5H_2O$, $Na_2HPO_4.12H_2O$, and $Na_4P_2O_7.10H_2O$.

8. A display device, comprising:
   a display panel configured to display an image by emitting light from a side surface thereof; and
   a window member disposed on the side surface of the display panel from which the light is emitted,
   wherein the window member includes:
   a base substrate including a light transmission area and a light blocking area, the light blocking area being adjacent to the light transmission area;
   a light blocking layer including a light blocking base and a heat radiating pigment dispersed in the light blocking base, the light blocking base having a color and being capable of blocking light, the light blocking layer being disposed on one surface of the base substrate in the light blocking area;
   a polymer film disposed between the base substrate and the light blocking layer, the polymer film covering one surface of the base substrate;
   an adhesive layer disposed between the base substrate and the polymer film;
   a pattern printed layer disposed between the polymer film and the light blocking layer in the light blocking area; and
   a depositing film disposed between the pattern printed layer and the light blocking layer in the light blocking area, the depositing film including a plurality of layers having different refractive indices, and
   wherein:
   the heat radiating pigment includes a center core including a latent heat material; and a core cover layer substantially surrounding the center core, the core cover layer including a polymer material in contact with the latent heat material.

9. The display device as claimed in claim 8, wherein a phase change temperature of the latent heat material is from about 15° C. to 50° C.

10. The display device as claimed in claim 8, wherein a diameter of the heat radiating pigment is from about 1 nm to 100 μm.

11. The display device as claimed in claim 8, wherein the heat radiating pigment includes:
    the center core including a carbon crystalline material; and
    the core cover layer surrounding the center core.

12. The display device as claimed in claim 8, wherein the latent heat material includes an inorganic salt hydrate having a formula ($M_n.H_2O$), where n is a positive non-zero integer, the inorganic salt hydrate is at least one of $Na_2SO_4.10H_2O$, $Zn(NO_3)_2.6H_2O$, $CaCl_2.6H_2O$, $Na_2S_2O_3.5H_2O$, $Na_2HPO_4.12H_2O$, and $Na_4P_2O_7.10H_2O$.

* * * * *